(12) United States Patent
Saarela

(10) Patent No.: US 6,615,051 B2
(45) Date of Patent: *Sep. 2, 2003

(54) RADIO TELECOMMUNICATIONS TERMINAL AND CONTROL METHOD

(75) Inventor: Petri Saarela, Espoo (FI)

(73) Assignee: Nokia Mobile Phones Limited, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 39 days.

(21) Appl. No.: 09/435,490

(22) Filed: Nov. 8, 1999

(65) Prior Publication Data

US 2002/0068596 A1 Jun. 6, 2002

(30) Foreign Application Priority Data

Nov. 6, 1998 (GB) .............................................. 9824424

(51) Int. Cl.[7] .................................................. H04B 7/00
(52) U.S. Cl. ........................................ 455/522; 455/574
(58) Field of Search .......................... 455/5.1, 522, 69, 455/70, 572, 573, 574, 575

(56) References Cited

U.S. PATENT DOCUMENTS

| | | | | |
|---|---|---|---|---|
| 5,056,109 A | * | 10/1991 | Gilhousen et al. | 370/342 |
| 5,212,823 A | * | 5/1993 | Fujii et al. | 455/522 |
| 5,590,409 A | * | 12/1996 | Sawahashi et al. | 455/69 |
| 5,761,622 A | * | 6/1998 | Priest | 455/522 |
| 5,790,940 A | * | 8/1998 | Laborde et al. | 455/69 |
| 5,815,798 A | * | 9/1998 | Bhagalia et al. | 455/13.4 |
| 5,898,921 A | * | 4/1999 | Liinamaa et al. | 455/423 |
| 5,905,962 A | * | 5/1999 | Richardson | 455/522 |
| 5,999,832 A | * | 12/1999 | Vannatta et al. | 455/575 |
| 6,018,650 A | * | 1/2000 | Petsko et al. | 455/234.1 |
| 6,223,056 B1 | * | 4/2001 | Appel | 455/561 |

* cited by examiner

Primary Examiner—Charles N. Appiah
(74) Attorney, Agent, or Firm—Antonelli, Terry, Stout & Kraus, LLP

(57) ABSTRACT

A terminal which includes an antenna for transmitting and receiving radio frequency signals, a radio frequency section that amplifies and demodulates a signal received by the antenna into a baseband signal and which modulates and amplifies a baseband signal received by the radio frequency section for transmission via the antenna, a processor to control the operation of the terminal, and memory for storing parameters and programs for use by the processor. The terminal is arranged to store in the memory information relating to a power level used in at least one transmission and, when such information is stored, to use this information to initiate a subsequent transmission.

13 Claims, 6 Drawing Sheets

RADIO TELECOMMUNICATIONS TERMINAL AND CONTROL METHOD

BACKGROUND OF THE INVENTION

This invention relates to a radio telecommunications terminal and in particular to a method and apparatus for optimising the power consumed by such a terminal. The invention is particularly suitable for use with digital systems.

An example of such a terminal is one for enabling a fixed telecommunication system, adapted for use with a public switched telephone network (PSTN), to operate over a wireless (e.g. radio) telecommunications network. The term "fixed system" as used herein is intended to mean a system of communication devices (e.g. telephones, facsimile machines, data devices) which are normally connected to a fixed local system. The communication devices themselves may be cordless and/or mobile and operate within the area local to the fixed system.

In telecommunications, the final drop from the local telephone exchange to a subscriber's terminal or private exchange is known as the "local loop". Traditionally this comprised a network of copper-pair lines, which are expensive to install and to maintain. In densely populated areas and/or countries with low telephone penetration this approach is impracticable. Wireless Local Loop (WLL) is a modern alternative to the copper network. In WLL a wireless (for example radio or infrared) system makes up all or part of the transmission path between the subscriber and the local exchange.

WLL allows the flexible allocation and reallocation of network resources and also has reduced installation time compared with fixed line networks. Thus WLL is particularly suitable for: providing network services quickly to small businesses and residential customers; cutting the cost of the local loop in remote or rural areas; providing telephone services in areas where accelerated development is required by regulatory bodies; and flexibly providing telecommunications services for instance at temporary locations such as exhibitions etc.

Generally WLL terminals comprise a transceiver, an external power supply and an antenna. More particularly a WLL terminal comprises an RF section for receiving and transmitting RF signals via an antenna; an interface for connecting a subscriber device to the wireless local loop terminal; a baseband section for converting received RF signals into baseband signals for transmission to the subscriber device and converting received baseband signals into RF signals for transmission by the RF section; and a subscriber line interface circuit for providing network dependent characteristics e.g. the tones (ringing, dial, engaged (busy) etc.) which, in a fixed network, are conventionally provided by the local exchange. A WLL terminal is capable of supporting many forms of transmission, for example speech, fax or data, and has interfaces for connecting to appropriate devices. An example of a known WLL system is described in British Patent Application no. 2311696.

The WLL terminals are fixed terminals i.e. they are designed to be fixed within a user's premises or with respect to the network. The terminals are typically fixed to the walls in a user's premises or to the walls of buildings for public network coverage. WLL typically use microwave, cordless or cellular technologies to interact with a radio telecommunications network.

A WLL terminal provides the interface between a subscriber's fixed telecommunication system (e.g. a private network or local area network) and the radio telecommunications network. When a user makes or receives a call via the WLL terminal, the WLL terminal establishes an uplink to the radio telecommunications network. In radio systems the transmitting power of a terminal is variable so as to avoid interference between terminals within the telecommunications system. Conventionally WLL terminals initiate transmission at a defined maximum power level and then adjust the power level in accordance with control signals sent from a controller of the radio system.

Similarly a mobile terminal for radio telecommunications conventionally initiates transmission at a defined maximum power level and then adjusts the power level in accordance with control signals sent from a controller of the radio system. The controller specifies the maximum power level and transmits this to the terminal continuously both when the terminal is in a stand-by mode and when the terminal is active. In the GSM specification this maximum transmission power level for the terminal is set by the parameter MS_TXPWR_MAX_CCH. This parameter is defined by the controller and may be specific to a controller, base station or coverage zone.

SUMMARY OF THE INVENTION

In accordance with the invention there is provided a terminal comprising: an antenna for transmitting and receiving radio frequency signals; a radio frequency section that amplifies and demodulates a signal received by the antenna into a baseband signal and which modulates and amplifies a baseband signal received by the radio frequency section for transmission via the antenna; a processor to control the operation of the terminal; and memory for storing parameters and programs for use by the processor; wherein the terminal is arranged to store in the memory information relating to an uplink power level used in at least one transmission and to use this information to initiate a subsequent transmission.

Thus the power level used when establishing a connection with a radio telecommunications network is optimised. This aims to reduce the power consumed by the terminal and also to prevent interference between the terminal and a subscriber device connected to the terminal. Interference between terminals within a coverage area is also reduced. Using lower power levels during a transmission may also result in more efficient re-use of transmission channels in neighbouring coverage areas.

Preferably the information relates to the immediately previous transmission and most advantageously to the maximum power level used in a previous transmission. The information may relate to the power level used in more than one e.g. three previous transmissions.

The terminal may be a wireless local loop terminal or a cellular radio telephone handset.

In accordance with a further aspect of the invention there is provided a method of controlling the power used by a radio terminal, the method comprising: transmitting a message to a radio telecommunications network; adjusting the power level of the transmitted message in accordance with control messages from the radio telecommunications network; storing information relating to the power level used during the transmission; and using the power level information to set the transmission power level to be used when initiating a subsequent transmission.

According to a further aspect of the invention there is provided apparatus for enabling a telephone system, adapted for use with a public switched telephone network, to operate over a radio telecommunications network, the apparatus comprising:

an antenna for transmitting and receiving radio frequency signals;

a radio frequency section that amplifies and demodulates a signal received by the antenna into a baseband signal and which modulates and amplifies a baseband signal received by the radio frequency section for transmission via the antenna;

a processor to control the operation of the terminal; and memory for storing parameters and programs for use by the processor; wherein the terminal is arranged to store in the memory information relating to a power level used in at least one transmission and, when such information is stored, to use this information to initiate a subsequent transmission.

BRIEF DESCRIPTION OF THE DRAWINGS

The invention will now be described by way of example only with reference to the accompanying drawings in which.

DETAILED DESCRIPTION OF THE INVENTION

Figure 1:
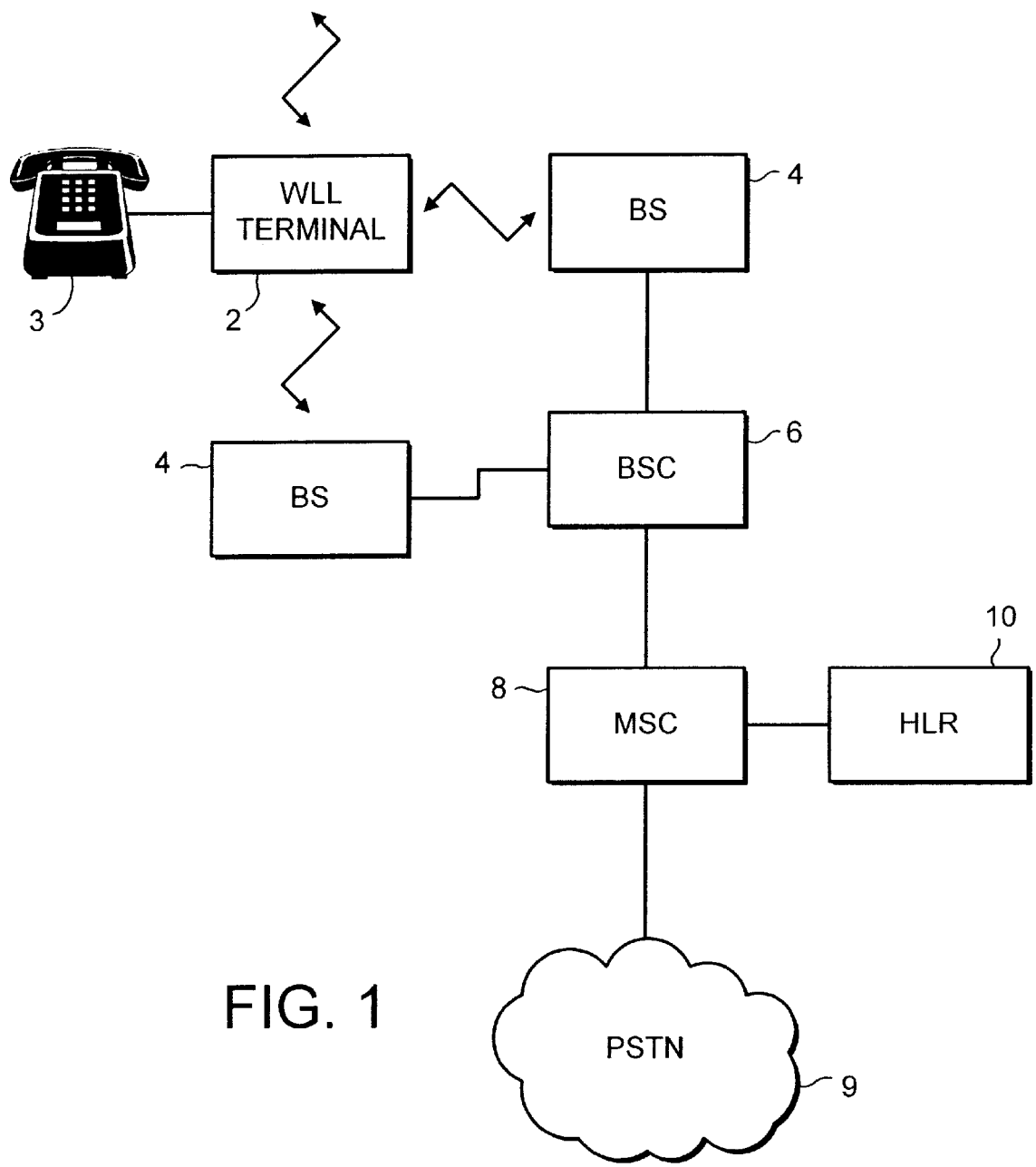
FIG. 1 shows an exemplary arrangement of a terminal according to the invention within a radio communications system.

FIG. 1 shows the arrangement of apparatus 2 according to the invention within a network. In this embodiment, the terminal 2 is a WLL terminal. A subscriber device 3 is connected to the WLL terminal 2 either via a fixed connection or via a wireless one. The device 3 may be a conventional fixed-line telephone, a mobile telephone, a facsimile machine, a data generating machine etc. The WLL terminal 2 is connected, via a radio link, to a cellular system that comprises at least one Base Station transceiver (BS) 4. The base stations are connected to a base station controller (BSC) 6 which is further connected to a mobile switching centre (MSC) 8. The switching centre 8 is connected to a core network 9 such as a public switched telephone network (PSTN) or a Public Land Mobile Network (PLMN). Also a home location register 10 is connected to the switching centre 8. Data relating to the subscribers of the system are stored in this register 10.

Figure 2:
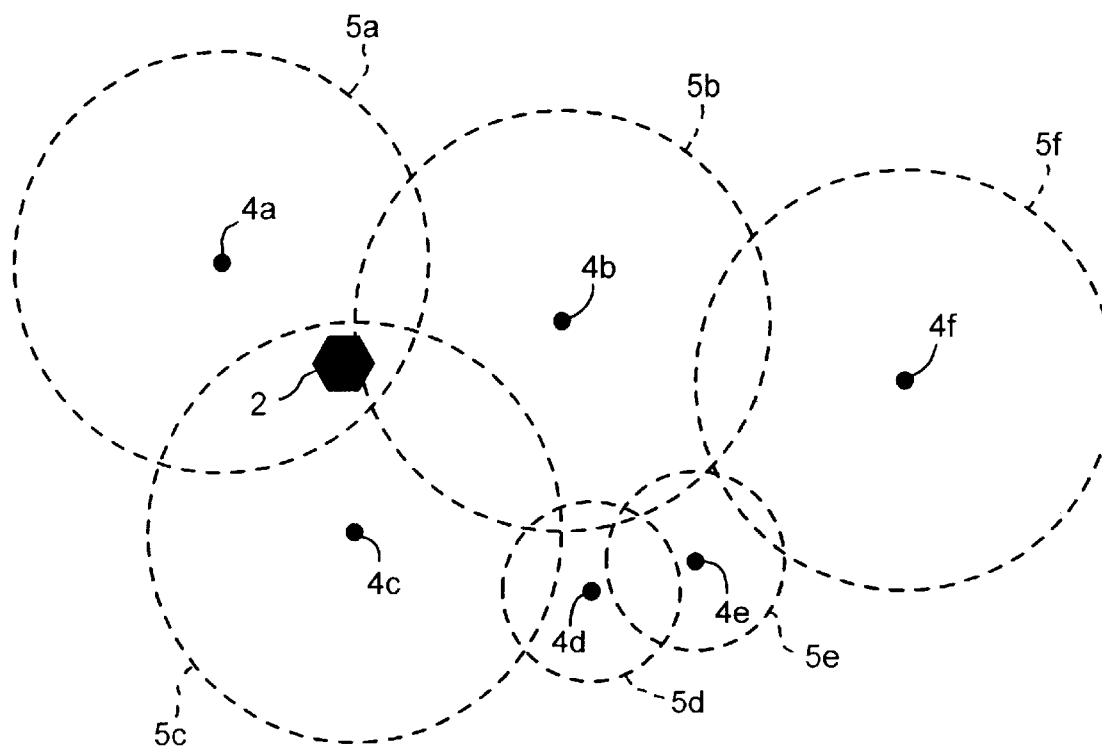
FIG. 2 shows an example of a cellular radio telecommunications system.

As shown in FIG. 2 each base station 4 has an area of cover 5 that is commonly referred to as a cell. In the example shown in FIG. 2, the terminal 2 is within the cells 5a and 5c of base stations 4a and 4c and just within range of the base station 4b. These base stations continuously transmit control signals to the terminal via a base station control channel BCCH. Normally, when a terminal 2 accesses a cell on a Random Access Channel (RACH), the terminal initiates transmission at the maximum power level specified by the base station with which the terminal is communicating. This base station will usually be the base station which has the strongest signal (a parameter that is continuously monitored by the terminal 2).

Figure 3:
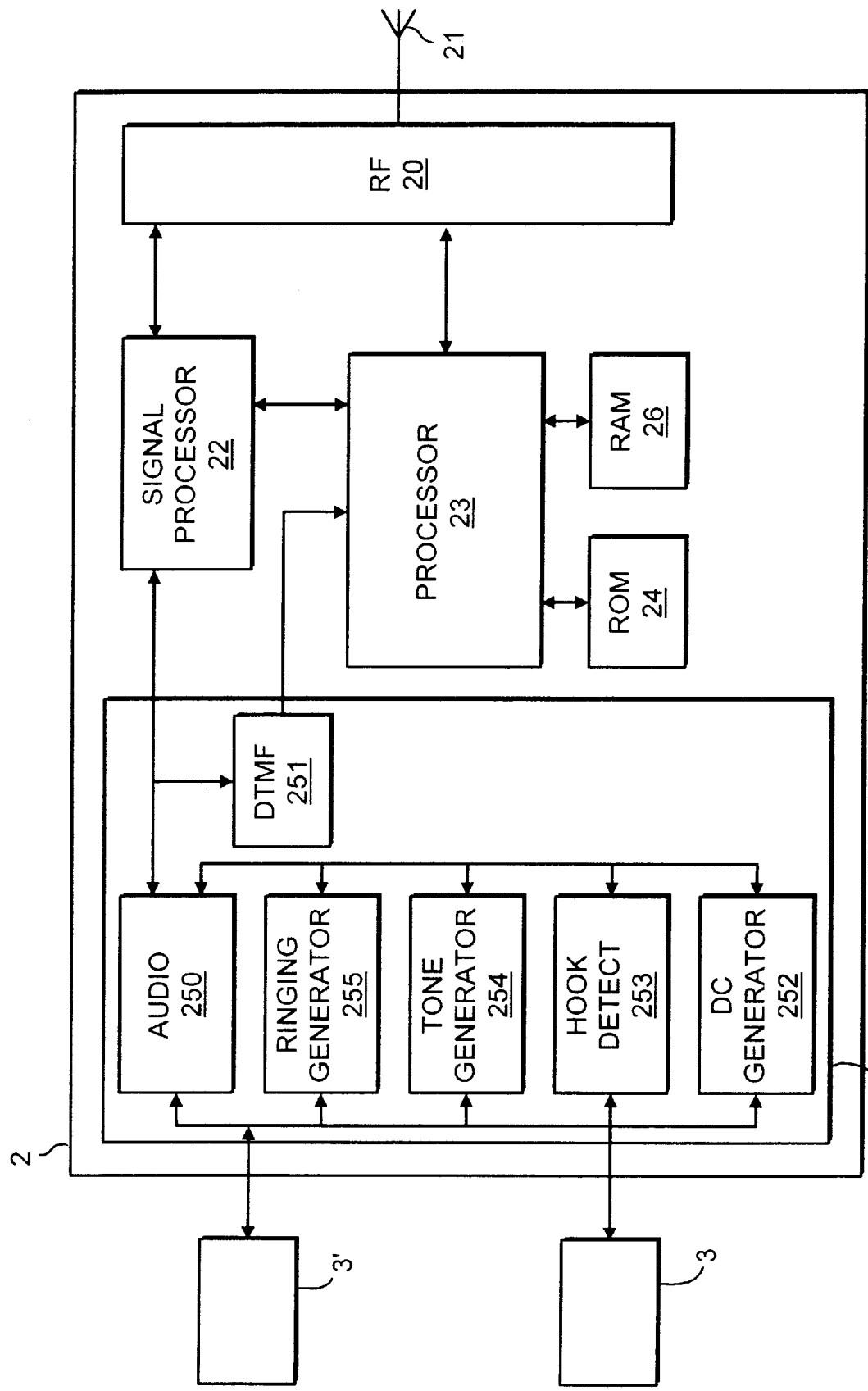
FIG. 3 shows a first embodiment of a terminal according to the invention.

FIG. 3 shows a first embodiment of a terminal 2 according to the invention. The terminal 2 is a WLL terminal for fixing within a user's premises (e.g. office) or vehicle or for fixing on buildings etc. to provide coverage for the general public. A WLL terminal enables a telephone system, adapted for use with a public switched telephone network, to operate over a radio telecommunications network The terminal comprises an antenna 21 for transmitting and receiving radio frequency (RF) signals. The antenna is connected to a RF section 20 that amplifies and demodulates a signal received by the antenna into a baseband signal. A signal processor 22 then processes the baseband signal. Similarly the baseband signal to be transmitted is processed by the signal processor 22 according to specifications of the cellular system and modulated and amplified by the RF section 20 for transmission.

A processor 23 controls the signal processor 22 and the RF section 20. A read-only memory (ROM) 24 stores programs and parameters used by the processor. The terminal 2 is supplied with power from an external power supply (not shown) or batteries (not shown) within the terminal. These batteries are generally supplied for back-up during external power supply failure.

A ringing Subscriber Line Interface Circuit (SLIC) 25 supplies the network characteristics e.g. the ringing and supervisory signals that allow a subscriber device 3 to operate with the network i.e. it undertakes some of the functions traditionally carried out by a conventional local exchange. SLICs also deliver analog voice signals and network dependent high-voltage ringing signals. The SLIC also monitors and provides the routine plain-old telephone service (POTS) supervisory signals that, for example, detect dial pulses and ensure that the phone does not ring when the handset is off-hook.

In particular, the SLIC 25 comprises an audio part 250 for adapting the audio signals from the signal processor 206 into a form suitable for a subscriber's telephone 3' and vice versa. A DTMF detector 251 detects dialling signals in the signal from the subscriber device 3 and transmits them to the processor 208. A DC generator 252 generates a supply voltage for a tone generator 254. A Hook detector 253 detects whether the subscriber device is on-hook or off-hook and transmits the status data to the processor 208 and to the tone generator 254. The tone generator 254 generates an audible and suitable line tone (dial, ringing, busy, number-unobtainable etc) which is transmitted to the subscriber device 3. A ringing signal generator 255 forms a high voltage ringing signal (for example 45 V AC) for the ringing function of the subscriber device 3.

Figure 4:
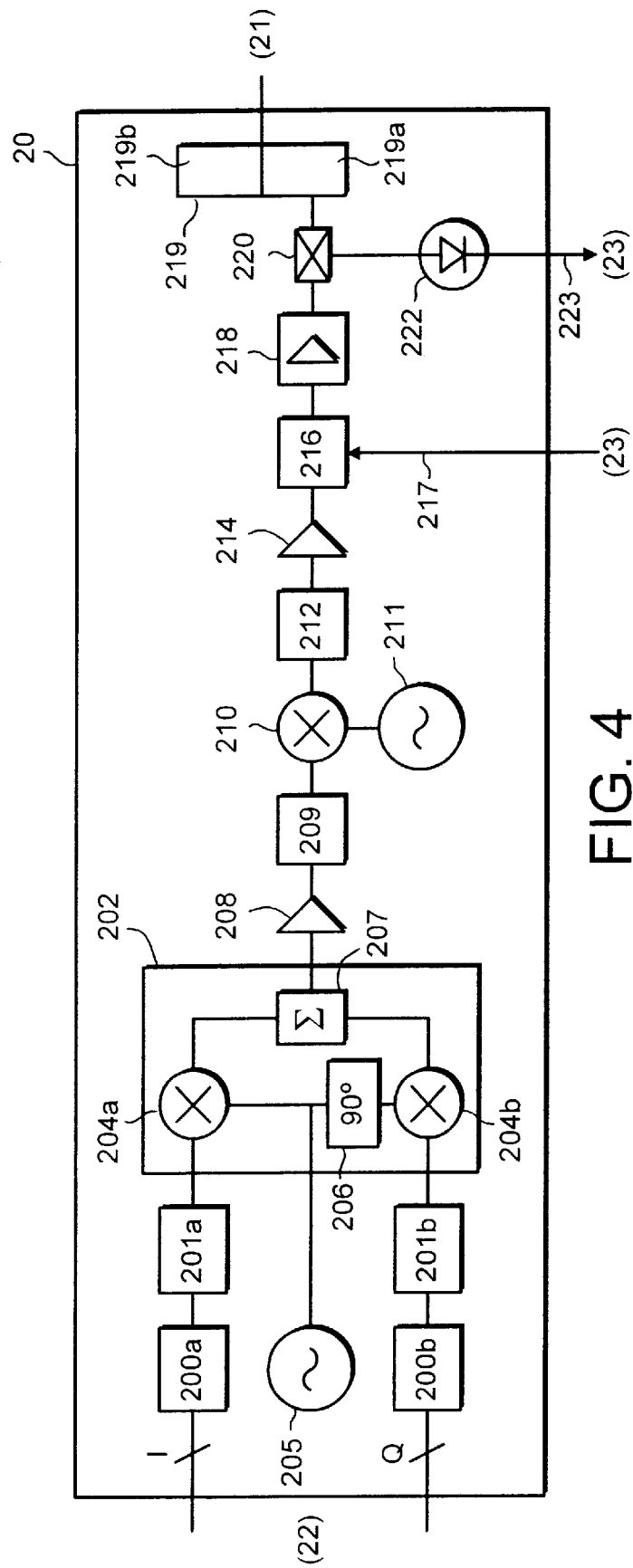
FIG. 4 shows an example of the RF section of the terminal shown in FIG. 3.

FIG. 4 shows in more detail the RF section 20 of the terminal 2. The RF section 20 is connected to the antenna 21 which is used to receive and transmit signals. It will be appreciated that only the transmit part of the RF section is shown in FIG. 4 and that the RF section 20 would also include a complementary receive part. The signal to be transmitted can be regarded as being two signals, one of which is the sine component and the other of which is the cosine component. These components are respectively referred to as the I and Q components. The I and Q components are initially at a baseband frequency. The I and Q signals are in digital form initially and are converted to analogue signals by respective digital to analogue converters (DAC) 200a and 200b. The output of each of the digital to analogue converters 200a, 200b is connected to a respective lowpass filter 201a and 201b. The lowpass filters 201a, 200b filter out undesired components which are introduced by the digital to analogue converters 200a and 200b.

The output of each of the lowpass filters 201a, 201b are input to an IQ modulator 202. The IQ modulator 202 includes two mixers 204a and 204b which mix each of the I and Q signals with a signal from a first local oscillator 205 to provide resulting bandpass signals at an intermediate frequency. The signal which is mixed with the Q component is 90° out of phase with the signal which is mixed with the I component of the signal. This 90° phase delay is introduced by delay element 206. The resulting I and Q signals which are now at the intermediate frequency are then summed by a summer 207 of the modulator 202 to provide a single bandpass signal.

The output of the summer 207 is input to a first amplifier 208 which amplifies the output of the summer 207. The output of the first amplifier 208 is input to a first bandpass filter 209 which filters out any undesired components of the signal which have been introduced by the first amplifier 208.

The output of the band pass filter 209 is input into a mixer 210 which also receives an input from a second local oscillator 211. The output from the second local oscillator 211 is mixed with the output from the band pass filter 209 to provide an output signal which is at the radio frequency i.e. the frequency at which the signal is to be transmitted by the antenna 21.

The output of the mixer 210 is input to a second bandpass filter 212 which filters out any undesired components introduced by the mixer 210. The output of the second bandpass filter 212 is input to a second amplifier 214 which amplifies the signal. The output of the second amplifier 214 is input to a gain control block 216. The gain control block 216 receives a control signal 217 which determines the gain to be applied to the signal. In particular, the gain control block 216 varies the amount of gain applied to the input signal in dependence on the control signal 217. The output of the gain control block 216 is input to a high power amplifier 218 which amplifies the signal by a fixed amount. The output of the high power amplifier 218 is output to the antenna 21 via a duplex filter 219.

To measure the power of the signal which is transmitted, a directional coupler 220 or similar device is provided. The coupler 220 allows a small proportion of the signal to be transmitted to be removed. The power level of that small proportion of the signal is measured using a radio frequency to DC rectifier 222 comprising a diode and passive component(s). By suitable scaling, a voltage value signal 223 indicative of the power level of the signal which is to be transmitted can be obtained.

The duplex filter 219 has a transmit portion 219a which is tuned to the radio frequency. The transmit portion 219a removes undesired components introduced by the transmission chain. The duplex filter 219 also has a receive portion 219b which is tuned to the receive frequency. The receive frequency is usually different from the transmit frequency.

The terminal 2 includes random access memory RAM 26 for storing a record of the maximum power level used during the transmission. This may be indicated by the signal 223. However, in GSM and other TDMA systems, there are several pre-determined power levels that mobile terminals can use for transmission. To maintain these levels, the control signal sent by the base station controller 6 may be stored in the RAM 26. When the terminal 2 next establishes a connection to a base station 4, this stored record is used to set the initial transmission power of the terminal i.e. the control signal 217.

When a subscriber of the WLL terminal initiates a call, the terminal establishes an uplink radio connection to the base station 4 via a Random Access Channel (RACH) and sends a message indicating the power level and quality of the transmitted signal. In response, the base station then sends a control message to the terminal 2 to control the transmission power level of the terminal 2, if required. The processor 23 outputs the control signal 217 to adjust the transmission power of the RF section 20 in response to this control message. The power level measurement signal 223 output by the DC rectifier 222 is passed to the microprocessor 23. This control sequence continues throughout the duration of the call. Similarly, when a call is received by the terminal 2 via a base station 4, the terminal establishes an uplink radio connection to the base station 4 via a Random Access Channel (RACH).

Figure 5:
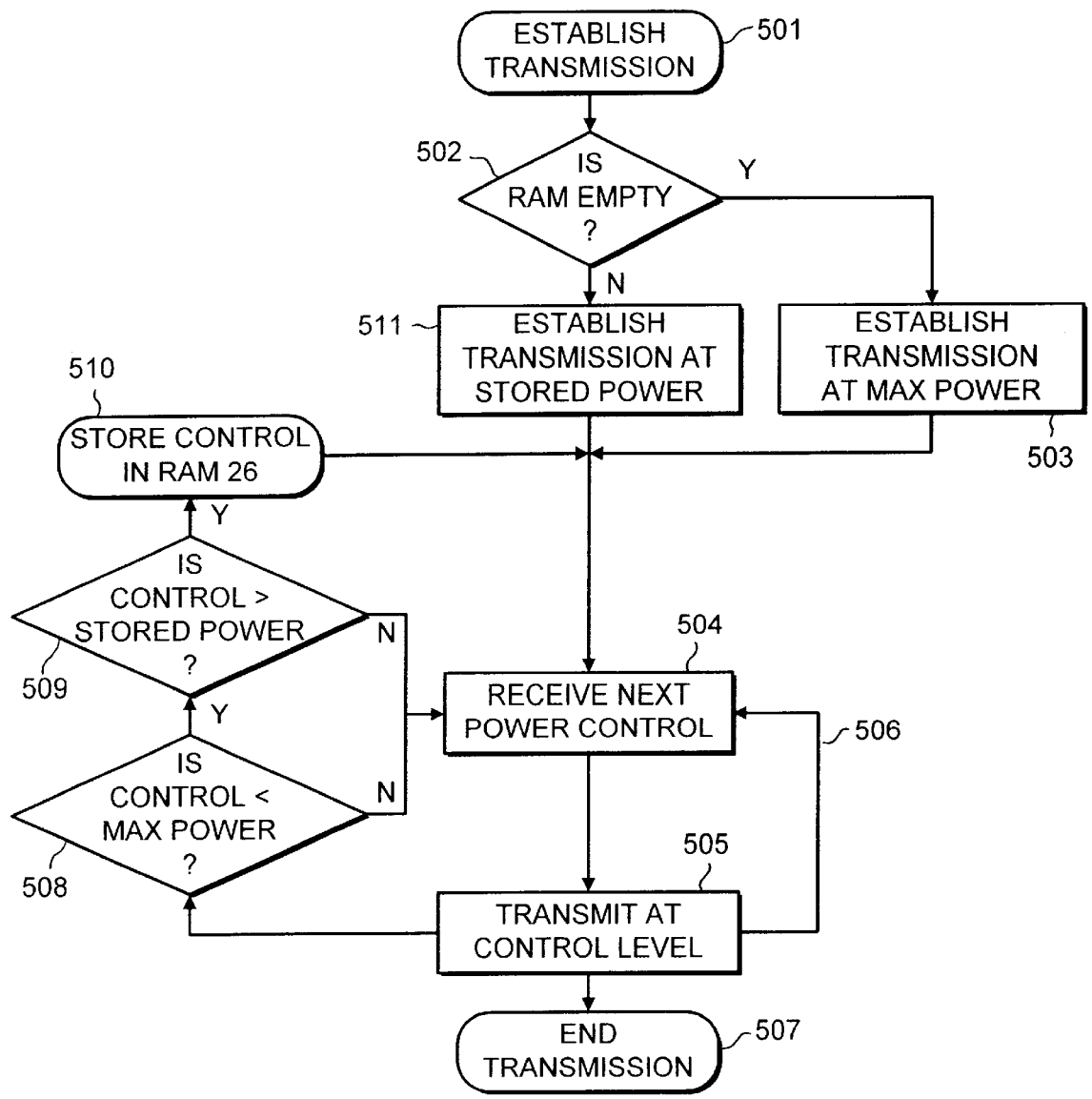
FIG. 5 is a flow diagram illustrating the operation of a terminal according to the invention.

The operation of a terminal according to the invention will now be described with reference to FIG. 5. Clearly the first time that such a terminal is used the RAM 26 will not contain any record of previous power levels. The terminal will therefore initiate transmission at the pre-defined maximum power level signalled by the base station.

When the terminal initiates a transmission (501) the contents of the RAM 26 are checked (502). If the RAM does not contain a record of a previous power level, the terminal initiates transmission (503) at the maximum power level specified by the MS_TXPWR_MAX_CCH transmitted by the base station. The base station 4 and/or base station controller 6 continuously monitor the quality and strength of the signal received from the terminal and, on the basis of these measurements instruct the transmitting terminal to increase or decrease the power level of the signal it is transmitting. The terminal therefore continuously receives (504) power control signals from the base station during a connection. In response the processor 23 adjusts the amount of amplification applied by the RF section 20 and hence the power level of the transmitted signal (505). This monitoring and adjustment continue (506) until the transmission ends (507).

During transmission the terminal also monitors the power level used by the terminal during the transmission. Each time a power control signal is received by the terminal it is compared (508) with the maximum power level specified MS_TXPWR_MAX_CCH. If the new power level specified in the control signal is equal to MS_TXPWR_MAX_CCH the new power level is not stored and the next power control signal is received (504).

If the new power level specified in the control signal is less than the maximum MS_TXPWR_MAX_CCH (508) but more than the record stored in the RAM 26 (509), the new power level is stored in the RAM 26 (510). If however the power level specified in the control signal is less than the maximum MS_TXPWR_MAX_CCH (508) but also less than the record stored in the RAM 26 (509), no further action is taken until the next power control signal is received (504).

Thus at the end of the transmission the RAM 26 is either empty or contains a record of the maximum power level (other than MS_TXPWR_MAX_CCH the maximum specified by the base station) used during the transmission. The RAM will be empty if the terminal 2 has only received control signals instructing it to transmit at the maximum level MS_TXPWR_MAX_CCH.

At the start (501) of the next transmission, the contents of the RAM 26 are checked (502). If the RAM contains a record of a power level used during a previous transmission, this level is used to initiate transmission (511) by the terminal 2. Thus the processor 23 forwards a control signal 217 to the RF section 20 to amplify the signal for transmission according to the stored power level. If however the RAM does not contain such a record, the maximum power level MS_TXPWR_MAX_CCH is used (503).

Rather than using the maximum power level from a previous transmission, the processor may be programmed to use some other power information from a previous transmission e.g. the average power when initiating transmission. In this case, the RAM 26 is used to store the average value of the power levels used. The processor may be arranged to calculate this average value during a transmission or alternatively the RAM may store all the values of power levels used (and the duration) and the processor may be arranged to calculate the average from these values once the transmission is terminated.

In a similar manner the processor may be arranged to form an average of the maximum power levels used in the previous n transmissions, where n is an integer.

The terminal is usually within range of more than one base station 4. In this case, the processor may be arranged to store information relating to the power level control signals from all base stations in the vicinity. When the terminal initiates transmission with a particular base station, the stored record of power level associated with that base station is then used for transmission. If no record is currently stored, the maximum specified by the base station is used. Thus the processor 2 is arranged to store in RAM 26 a record for each base station with which the terminal is in contact.

It is possible that the stored power level is not sufficient to establish a radio connection with a base station. This may be because the transmission path between the base station and the terminal is obstructed in some way or the cell of the base station is congested. To avoid the occurrence of a terminal not being able to establish a connection, the processor may be arranged to ramp up the transmission power level from the stored level to the maximum level specified by the base station.

Figure 6:
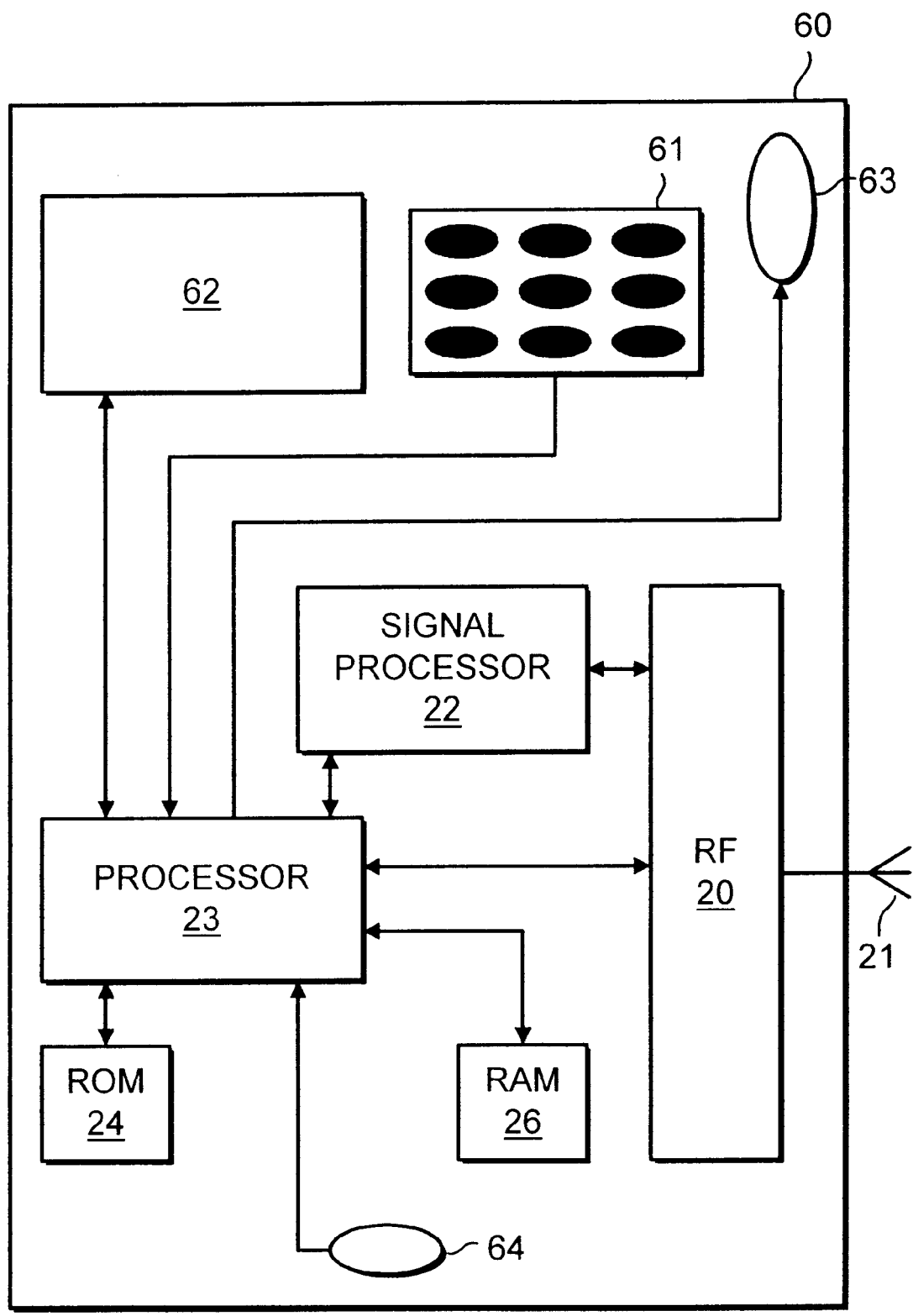
FIG. 6 shows a second embodiment of a terminal according to the invention.

FIG. 6 shows a further embodiment of a terminal according to the invention, the terminal 60 being a mobile terminal such as a cellular telephone. The terminal comprises a keypad 61 and a display 62 such as a LCD display for displaying characters e.g. alphanumeric characters. A speaker 63 allows an audio signal to be output and a microphone 64 allows an audio signal to be input. As in the terminal of the first embodiment, the terminal comprises an RF section 20, an antenna 21, a signal processor 22, a processor 23, ROM 24 and RAM 26. In the same way, the processor 23 stores values of the power levels used by the cellular phone 60 during transmission in the RAM 26. Thus, on subsequent use of the cellular telephone, the maximum power level stored is used in an attempt to establish a connection.

The embodiments described herein are intended to be exemplary only and various modifications may be apparent to a skilled person. The examples described are not to be limiting and, for example, the invention is applicable to a terminal operating according to a protocol other than GSM.

What is claimed is:

1. A terminal comprising:
   an antenna for transmitting and receiving radio frequency signals;
   a radio frequency section that amplifies and demodulates a signal received by the antenna into a baseband signal and which modulates and amplifies a baseband signal received by the radio frequency section for transmission via the antenna;
   a processor to control the operation of the terminal; and
   a memory for storing parameters and programs for use by the processor,
   wherein the terminal is arranged to store in the memory a predefined maximum transmission power level parameter and information relating to a maximum transmission power level used in at least one previous transmission, the processor further including means for calculating said maximum transmission power level used in at least one previous transmission said maximum transmission power level used in at least one previous transmission being less than said predefined maximum transmission power level parameter and, when such information is stored, controlling a transmission power level in a current transmission such that said transmission power level in said current transmission is initiated according to said maximum transmission power level used in said at least one previous transmission, and controlling each of said maximum transmission power level of said at least one previous transmission and said current transmission power level to not exceed said predefined maximum transmission power level parameter.

2. A terminal according to claim 1 wherein the information relates to the immediately previous transmission.

3. A terminal according to claim 2 wherein the maximum transmission power level has been used in a plurality of previous transmissions.

4. A terminal according to claim 1, wherein the maximum transmission power level has been used in a plurality of previous transmissions.

5. A terminal according to claim 4, wherein the maximum transmission power level has been used in up to three previous transmissions.

6. A terminal according to claim 1, wherein the terminal is a wireless local loop terminal.

7. A method of controlling the power used by a radio terminal, said method comprising:
   transmitting a message to a radio telecommunications network;
   adjusting the transmission power level of the transmitted message in accordance with control messages from the radio telecommunications network;
   storing a predefined maximum transmission power level parameter and information relating to a maximum transmission power level used during at least one previous transmission, said maximum transmission power level used being less than said predefined maximum transmission power level parameter; and
   controlling a transmission power level in a current transmission such that the current transmission power level in said current transmission is initiated according to said maximum transmission power level used during said at least one previous transmission, and controlling each of said maximum transmission power level of said at least one previous transmission and said current transmission power level to not exceed said predefined maximum transmission power level parameter.

8. A method according to claim 7, wherein the maximum transmission power level used during a transmission is stored.

9. A method according to claim 8, wherein the maximum transmission power level used during at least three previous transmissions is stored.

10. A method according to claim 7, wherein the maximum transmission power level used during at least three previous transmissions is stored.

11. A method according to claim 10 wherein the terminal is a wireless local loop terminal.

12. A method according to claim 7 wherein the terminal is a wireless local loop terminal.

13. Apparatus for enabling a telephone system, adapted for use with a public switched telephone network, to operate over a radio telecommunications network, said apparatus comprising:

an antenna for transmitting and receiving radio frequency signals;

a radio frequency section that amplifies and demodulates a signal received by the antenna into a baseband signal and which modulates and amplifies a baseband signal received by the radio frequency section for transmission via the antenna;

a processor to control the operation of the terminal; and a memory for storing parameters and programs for use by the processor, wherein the terminal is arranged to store in the memory a predefined maximum transmission power level parameter and information relating to a maximum transmission power level used in at least one previous transmission the processor further including means for calculating said maximum transmission power level used in at least one previous transmission, said maximum transmission power level used during at least one previous transmission being less than said predefined maximum power level parameter and, when such information is stored, controlling a transmission power level in a current transmission such that the current transmission power level in said current transmission is initiated according to said maximum transmission power level used during said at least one previous transmission, and controlling each of said maximum transmission power level of said at least one previous transmission and said current transmission power level to not exceed said predefined maximum transmission power level parameter.

* * * * *